US012584018B2

(12) United States Patent
Doni et al.

(10) Patent No.: US 12,584,018 B2
(45) Date of Patent: Mar. 24, 2026

(54) MODIFIED BITUMEN COMPOSITION AND PROCESS OF PREPARATION THEREOF

(71) Applicant: HINDUSTAN PETROLEUM CORPORATION LIMITED, Bangalore (IN)

(72) Inventors: Eswararao Doni, Bangalore (IN); Siva Kesava Raju Chinthalapati, Bangalore (IN); Raghava Krishna Kanala, Bangalore (IN); Ravi Balasubramaniam, Bangalore (IN)

(73) Assignee: HINDUSTAN PETROLEUM CORPORATION LIMITED, Bangalore (IN)

( * ) Notice: Subject to any disclaimer, the term of this patent is extended or adjusted under 35 U.S.C. 154(b) by 540 days.

(21) Appl. No.: 18/027,317

(22) PCT Filed: Aug. 2, 2021

(86) PCT No.: PCT/IN2021/050743
§ 371 (c)(1),
(2) Date: Mar. 20, 2023

(87) PCT Pub. No.: WO2022/091114
PCT Pub. Date: May 5, 2022

(65) Prior Publication Data
US 2023/0374309 A1      Nov. 23, 2023

(30) Foreign Application Priority Data
Oct. 29, 2020    (IN) ............................. 202041047354

(51) Int. Cl.
| | |
|---|---|
| *C08L 95/00* | (2006.01) |
| *C08J 3/22* | (2006.01) |
| *C08K 3/06* | (2006.01) |
| *C08K 3/32* | (2006.01) |
| *C08K 3/34* | (2006.01) |
| *C08K 5/132* | (2006.01) |
| *C08K 13/02* | (2006.01) |
| *E01C 7/26* | (2006.01) |
| *E01C 19/46* | (2006.01) |

(52) U.S. Cl.
CPC .............. *C08L 95/00* (2013.01); *C08J 3/226* (2013.01); *C08K 13/02* (2013.01); *E01C 7/267* (2013.01); *E01C 19/46* (2013.01); *C08J 2395/00* (2013.01); *C08J 2495/00* (2013.01); *C08K 3/06* (2013.01); *C08K 2003/329* (2013.01); *C08K 3/346* (2013.01); *C08K 5/132* (2013.01); *C08K 2201/014* (2013.01); *C08L 2310/00* (2013.01); *C08L 2555/54* (2013.01)

(58) Field of Classification Search
CPC .. C08L 95/00; C08L 2310/00; C08L 2555/54; C08L 91/00; C08J 3/226; C08J 2395/00; C08J 2495/00; C08K 13/02; C08K 3/06; C08K 3/346; C08K 5/132; C08K 2003/329; C08K 2201/014; C08K 3/32; C08K 5/098; C08K 5/13; E01C 7/267; E01C 19/46; E01C 7/18; B01J 21/16; B01J 23/745
See application file for complete search history.

(56) References Cited

U.S. PATENT DOCUMENTS

| | | | | |
|---|---|---|---|---|
| 6,133,351 A | * | 10/2000 | Hayner ................... | C08L 95/00 524/68 |
| 9,862,829 B2 | | 1/2018 | Yadav et al. | |
| 2007/0125268 A1 | * | 6/2007 | Deme ..................... | C08L 95/00 106/456 |
| 2011/0082240 A1 | | 4/2011 | Crews | |
| 2011/0146531 A1 | * | 6/2011 | Mitra ...................... | C08L 95/00 106/18.11 |
| 2013/0004662 A1 | * | 1/2013 | Chughtai ................ | E01C 7/267 106/274 |

FOREIGN PATENT DOCUMENTS

| | | | | | |
|---|---|---|---|---|---|
| CA | 2695829 | A1 | 2/2009 | | |
| EP | 1704178 | A1 | 9/2006 | | |
| EP | 2185640 | B1 | * 11/2010 | ............. | C08L 95/00 |
| EP | 2539402 | A1 | 1/2013 | | |
| EP | 2539402 | B1 | * 12/2013 | .............. | C08K 5/09 |
| WO | WO-2005059016 | A1 | * 6/2005 | ............. | C08L 95/00 |
| WO | 2011104726 | A1 | 9/2011 | | |

(Continued)

OTHER PUBLICATIONS

EP2185640B1 Machine Translation (Year: 2010).*
Copending U.S. Appl. No. 17/995,059 (Year: 2025).*
Uma Chakkoth et al. "Component blending for bitumen production for Indian refineries" Indian Academy of Sciences, Sadhana (2020) 45:48, https://doi.org/10.1007/s12046-020-1268-9, Published Online: Feb. 13, 2020, pp. 1-48.
Uma Chakkoth et al. "Influence of Viscosities of PDA Pitch and Flux on Blended Bitumen Viscosity" Airfield and Highway Pavements 2017, 1Research Scholar, Copyright of ASCE, Dept. of Civil Engineering, IIT Madras, Chennai, Tamil Nadu 600036, India, Downloaded from ascelibrary.org by University of Toronto on Dec. 4, 2017, pp. 225-235.

(Continued)

*Primary Examiner* — Pamela H Weiss
(74) *Attorney, Agent, or Firm* — The Belles Group, P.C.

(57) ABSTRACT

The present disclosure relates to a modified bitumen composition comprising: (a) at least two refinery residues; and (b) a sulphur additive comprising: (i) sulphur; (ii) at least one $H_2S$ suppressant; (iii) at least one smell masking agent; and (iv) bitumen, wherein the sulphur and the at least one $H_2S$ suppressant is in the weight ratio range of 4:1 to 100:1. The present disclosure also discloses a process of preparing a modified bitumen composition and a process of preparing an asphalt pavement comprising a modified bitumen composition. Also provided herein use of a modified bitumen composition as an additive for waterproofing and road construction.

8 Claims, No Drawings

(56) References Cited

FOREIGN PATENT DOCUMENTS

WO          2021205465 A1     10/2021

OTHER PUBLICATIONS

Uma Chakkoth et al. "Characterization of Colloidal Stability of Blended Bitumen" Transportation Research. Lecture Notes in Civil Engineering, vol. 45. Springer, Singapore (2020), pp. 1-12.
N. K. Rajan et al. "Rheological Characterization of Blended Paving Asphalt" (2008) Rheological Characterization of Blended Paving Asphalt, Road Materials and Pavement Design, 9:sup1, 67-86, DOI: 10.1080/14680629.2008.9690159, ISSN: 1468-0629, http://dx.doi.org/10.1080/14680629.2008.9690159, Published online: Sep. 19, 2011, pp. 67-86.
R. Gambert "What are the ecological and profitable uses of refinery residues?" HP Hydrocarbon Processing, Refining Developments, Aug. 2014, pp. 65-67.

* cited by examiner

MODIFIED BITUMEN COMPOSITION AND PROCESS OF PREPARATION THEREOF

CROSS-REFERENCE TO RELATED PATENT APPLICATIONS

The present application is a U.S. national stage application under 35 U.S.C. § 371 of PCT/IN2021/050743, filed Aug. 2, 2021, which claims priority to Indian Patent Application No. number 202041047354 filed on Oct. 29, 2020. The disclosures of the aforementioned priority applications are incorporated herein by reference.

FIELD OF INVENTION

The present disclosure broadly relates to the field of bituminous compositions and particularly refers to a modified bitumen composition. The present disclosure further relates to the process for the preparation of said modified bitumen composition and its use in waterproofing and road construction.

BACKGROUND OF INVENTION

For road construction purposes, mixtures of sand, gravel and asphaltenes is coated with bitumen compositions to form a course grained liquid mixture that is spread out as a uniform layer on the road surface. Bitumen is a complex material that forms through the distillation of crude oil and contains a number of aromatic and aliphatic hydrocarbon compounds. Viscosity grade (VG) bitumen (asphalt) is one of the most widely used grades of bitumen for road construction and paving sidewalks. VG bitumen has thermoplastic properties which makes it hard and stiff at lower temperatures and soft at higher temperatures.

With the increasing stress of traffic volume, axle loads and temperature variations, the bitumen coated road pavements often undergo deformation and depressions leading to formation of deep cracks and holes. Thus, to improve the mechanical properties of bitumen for road construction, the base bitumen is being modified by adding a number of additives such as plastics, synthetic polymer additives, sulphur, solvents, etc. Also, the addition of sulphur in bitumen, which is readily available as a refinery by-product is a less costly additive used in bitumen to reduce asphalt consumption and also improve the quality of base bitumen, thereby improving its mechanical properties. However, one of the problem that arises from using sulphur is that it releases a highly poisonous hydrogen sulfide ($H_2S$) gas during the bitumen modification or road paving process. As a solution to this, $H_2S$ suppressant agents are being used which trap the evolved $H_2S$ gas by various physical and chemical reactions.

U.S. Pat. No. 9,862,829B2 discloses a hybrid modified bitumen composition comprising a petroleum vacuum, a synthetic rubber, a dual functional agent, and a functionalized polymer. LT6533B relates to a heavy transport load and cold weather resistant modified bitumen composition comprising bitumen, used tires and styrene-butadiene-styrene polymer. US20110082240A1 discloses a rosin-oil modified bitumen compound comprising bitumen component and rosin oil.

Although, considerable amount of research has been devoted towards modifying bitumen to incorporate the desired mechanical properties, there still exists a dearth in the existing state of the art for a bitumen composition which not only exhibits capability to withstand heavy traffic loads and extreme weather conditions but also resolves the environmental concerns associated with the existing bitumen compositions.

SUMMARY OF THE INVENTION

In a first aspect of the present disclosure, there is provided a modified bitumen composition comprising: (a) at least two refinery residues; and (b) a sulphur additive comprising: (i) sulphur; (ii) at least one $H_2S$ suppressant; (iii) at least one smell masking agent; and (iv) bitumen, wherein the sulphur and the at least one $H_2S$ suppressant is in the weight ratio range of 4:1 to 100:1.

In a second aspect of the present disclosure, there is provided a modified bitumen composition comprising: (a) propane deasphalted (PDA) pitch in the range of 70-90 wt % with respect to the composition; (b) vacuum tower bottom (VTB) in the range of 0-17 wt % with respect to the composition; (c) flux in the range of 5-15 wt % with respect to the composition; (d) the sulphur additive comprising the sulphur in the range of 90-95 wt % with respect to the additive, the at least one $H_2S$ suppressant in the range of 1.9-7 wt % with respect to the additive, the at least one smell masking agent in the range of 0.04-0.5 wt % with respect to the additive, and the bitumen in the range of 0.5-3 wt % with respect to the additive; and (e) optionally, at least one filler.

In a third aspect of the present disclosure, there is provided a sulphur additive comprising: (a) sulphur; (b) at least one $H_2S$ suppressant; (c) at least one smell masking agent; and (d) bitumen, wherein the sulphur and the at least one $H_2S$ suppressant is in the weight ratio range of 4:1 to 100:1.

In a fourth aspect of the present disclosure, there if provided a process for preparing the modified bitumen composition comprising: (a) at least two refinery residues; and (b) a sulphur additive comprising: (i) sulphur; (ii) at least one $H_2S$ suppressant; (iii) at least one smell masking agent; and (iv) bitumen, wherein the sulphur and the at least one $H_2S$ suppressant is in the weight ratio range of 4:1 to 100:1, the process comprising: (1) blending the at least two refinery residues to obtain a homogenous mixture; (2) mixing the sulphur additive to obtain a first mixture; and (3) contacting the homogeneous mixture and the first mixture to obtain the modified bitumen composition.

In a fifth aspect of the present disclosure, there is provided a process for preparing an asphalt pavement, wherein (a) the modified bitumen composition is prepared by the process as described herein; (b) the modified bitumen composition as prepared herein, is mixed with asphalt to obtain a compact mixture; and (c) the compact mixture is spread to form a layer of the asphalt pavement.

In a sixth aspect of the present disclosure, there is provided an asphalt pavement prepared by the process, wherein (a) the modified bitumen composition is prepared by the process as described herein; (b) the modified bitumen composition as prepared herein, is mixed with asphalt to obtain a compact mixture; and (c) the compact mixture is spread to form a layer of the asphalt pavement.

In a seventh aspect of the present disclosure, there is provided use of the modified bitumen composition comprising: (a) at least two refinery residues; and (b) a sulphur additive comprising: (i) sulphur; (ii) at least one $H_2S$ suppressant; (iii) at least one smell masking agent; and (iv) bitumen, wherein the sulphur and the at least one $H_2S$ suppressant is in the weight ratio range of 4:1 to 100:1, as an additive for waterproofing and road construction These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

DETAILED DESCRIPTION OF THE INVENTION

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively, and any and all combinations of any or more of such steps or features.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a mixing speed range of about 50-400 rpm should be interpreted to include not only the explicitly recited limits of about 50 rpm to about 400 rpm, but also to include sub-ranges, such as 55-100 rpm, 350-399 rpm, and so forth, as well as individual amounts, including fractional amounts, within the specified ranges, such as 55.2 rpm, and 395.255 rpm, for example.

The term "refinery residues" used herein refers to the substances obtained as a residue from the distillation of crude oils that are added as a base material for bitumen production.

The term "filler" used herein refers to substances added in bituminous component mixtures to provide toughness and higher viscosity.

The term "asphalt" used herein refers to thick black substance obtained from processing of crude oil that is mixed with the modified bitumen composition of the present disclosure and used for paving road surfaces.

The term "asphalt pavement" used herein refers to road surface made with the mixture of asphalt and modified bitumen composition of the present disclosure.

The term "viscosity ratio" used herein refers to ratio of viscosity residue from rolling thin film oven test to unaged bitumen, both measured at 60° C.

The VG30 and VG40 grade specification refer to the bitumen grade based on viscosity and suitability recommended for maximum air temperature as prescribed in the IS 73, 2013 paving grade specification.

The term "$Fe(acac)_3$" used herein refers to Tris(acetylacetonato)iron (III).

The term "$Fe(EHA)_3$" used herein refers to Iron tris(2-ethylhexanoate).

The term "$FeCl_3$" refers to ferric chloride.

The term "FCC refinery spent catalyst" refers to fluid catalytic cracking refinery spent catalyst.

The term "HDS refinery spent catalyst" refers to hydrodesulfurization refinery spent catalyst.

The term "DHDS refinery spent catalyst" refers to diesel hydrodesulfurization unit refinery spent catalyst.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present disclosure is not to be limited in scope by the specific embodiments described herein, which are intended for the purposes of exemplification only. Functionally-equivalent products, compositions, and methods are clearly within the scope of the disclosure, as described herein.

As discussed in the background section, the currently used bitumen compositions modified with various chemical additives such as solvents and sulfur, emit fugitive vapors such as hydrogen sulfide which not only pose several health hazards for the workers, but also creates air pollution. The production of pungent smelling $H_2S$ gas also renders the surrounding atmosphere unpleasant and unhealthy for the vehicle riders. Moreover, the solvents often tend to leach out into the soil and underground water bodies and deteriorate the soil and water quality. Thus, with an aim to overcome the setbacks of the existing bitumen modification techniques, the present disclosure provides a modified bitumen composition with a combination of at least two refinery residues and a sulfur additive. The combination of at least two refinery residues used in the present disclosure, impart the desired penetration point at 25° C. and viscosity to the modified bitumen composition which are critical parameters to qualify for the VG30 and VG40 grade specification (as per IS 73, 2013 for paving bitumen specifications). Thus, the modified bitumen composition disclosed herein can be used for paving roads meant for heavy traffic loads and high abrasion temperatures. The modified bitumen composition of the present disclosure also includes a sulfur additive comprising sulfur and a $H_2S$ gas suppressing agent in the weight ratio range of 4:1 to 100:1. This provides a remarkable reduction of the hydrogen sulphide emission levels to as low as 0.1 ppm. To mask the smell of $H_2S$ gas, smell masking agents such as geraniol and vanillin are also added in the preparation of the sulfur additive.

Propane deasphalting is one of the process used for producing paving grade bitumen. It is an extraction process in which vacuum residuum is contacted with propane to extract and separate heavy oils from vacuum residue and obtain propane deasphalted (PDA) pitch. The propane deasphalting process results in a mixture of asphaltene and PDA pitch having low penetration material (less than 12) with a very high viscosity at 60° C. of around 20,000 poises. Flux is an extract from solvent extraction unit in the refinery process which is rich in aromatics and vacuum tower bottom (VTB) is leftover product obtained at the bottom of crude oil separation distillation tower. In the component blending process, the PDA pitch is blended with low viscous flux and vacuum tower bottom (VTB) (viscosity measured at 60° C. is around 0.8 poise). Choices of the blending proportions are dictated by the specification parameters to be satisfied i.e., VG 10 to VG 40 grades. The modified bitumen composition of the present disclosure is prepared by three and four component blending process. Four component blending process involves addition of vacuum tower bottom (VTB), flux and sulphur additive to PDA pitch. In three component blending process, flux and sulphur additives are added to the PDA pitch. Appropriate filler material may also be added to fill the voids in the mixture and achieve desired toughness. The present disclosure also discloses a process for preparing the modified bitumen composition comprising steps, wherein the at least two refinery residues and the sulfur additives are mixed separately to form two separate homogeneous mixtures. Then both the mixtures are contacted at appropriate temperature and mixing conditions to form the modified bitumen composition. The process as described herein, helps in achieving a well-blended modified bitumen composition which qualifies the standard IS 73, 2013 for paving bitumen specifications. Hence, based on the above beneficial aspects associated with the present disclosure, it is highly expected that the present modified bitumen composition shall pave a shining way in the realm of conventionally used bitumen compositions.

In an embodiment of the present disclosure, there is provided a modified bitumen composition comprising: (a) at least two refinery residues; and (b) a sulphur additive comprising: (i) sulphur; (ii) at least one $H_2S$ suppressant; (iii) at least one smell masking agent; and (iv) bitumen, wherein the sulphur and the at least one $H_2S$ suppressant is in the weight ratio range of 4:1 to 100:1. In one another embodiment of the present disclosure, the sulphur and the at least one $H_2S$ suppressant is in the weight ratio range of 10:1 to 50:1. In yet another embodiment of the present disclosure, the sulphur and the at least one $H_2S$ suppressant is in the weight ratio range of 15:1 to 20:1.

In an embodiment of the present disclosure, there is provided a modified bitumen composition comprising: (a) at least two refinery residues selected from propane deasphalted (PDA) pitch, vacuum tower bottom (VTB), flux, low viscous extract, and vacuum gas oils; and (b) a sulphur additive comprising: (i) sulphur; (ii) at least one $H_2S$ suppressant; (iii) at least one smell masking agent; and (iv) bitumen, wherein the sulphur and the at least one $H_2S$ suppressant is in the weight ratio range of 4:1 to 100:1. In one another embodiment of the present disclosure, the at least two refinery residues is a combination of propane deasphalted (PDA) pitch, vacuum tower bottom (VTB), and flux. In yet another embodiment of the present disclosure, the at least two refinery residues is a combination of propane deasphalted (PDA) pitch and flux.

In an embodiment of the present disclosure, there is provided a modified bitumen composition comprising: (a) at least two refinery residues; and (b) a sulphur additive comprising: (i) sulphur; (ii) at least one $H_2S$ suppressant selected from FCC refinery spent catalyst, HDS refinery spent catalyst, DHDS refinery spent catalyst, $Fe(acac)_3$, $Fe(EHA)_3$, $FeCl_3$, calcium oxide, calcium carbonate, bentonite clay, wood charcoal, or combinations thereof; (iii) at least one smell masking agent selected from eugenol, linalool, geraniol, vanillin, iso-amyl ester, phenyl amyl ester, limonene, cinnamaldehyde, or combinations thereof; and (iv) bitumen, wherein the sulphur and the at least one $H_2S$ suppressant is in the weight ratio range of 4:1 to 100:1.

In an embodiment of the present disclosure, there is provided a modified bitumen composition comprising: (a) at least two refinery residues; and (b) a sulphur additive comprising: (i) sulphur; (ii) at least one $H_2S$ suppressant; (iii) at least one smell masking agent; and (iv) bitumen, wherein the sulphur and the at least one $H_2S$ suppressant is in the weight ratio range of 4:1 to 100:1, and wherein the sulphur additive is in the range of 2-15 wt % with respect to the composition. In one another embodiment of the present disclosure, the sulphur additive is in the range of 3-10 wt % with respect to the composition. In yet another embodiment of the present disclosure, the sulphur additive is in the range of 4-7 wt % with respect to the composition.

In an embodiment of the present disclosure, there is provided a modified bitumen composition comprising: (a) at least two refinery residues selected from propane deasphalted (PDA) pitch, vacuum tower bottom (VTB), flux, low viscous extract, and vacuum gas oils; and (b) a sulphur additive comprising: (i) sulphur; (ii) at least one $H_2S$ suppressant selected from FCC refinery spent catalyst, HDS refinery spent catalyst, DHDS refinery spent catalyst, $Fe(acac)_3$, $Fe(EHA)_3$, $FeCl_3$, calcium oxide, calcium carbonate, bentonite clay, wood charcoal, or combinations thereof; (iii) at least one smell masking agent selected from eugenol, linalool, geraniol, vanillin, iso-amyl ester, phenyl amyl ester, limonene, cinnamaldehyde, or combinations thereof; and (iv) bitumen, wherein the sulphur and the at least one $H_2S$ suppressant is in the weight ratio range of 4:1 to 100:1.

In an embodiment of the present disclosure, there is provided a modified bitumen composition comprising: (a) at least two refinery residues selected from propane deasphalted (PDA) pitch, vacuum tower bottom (VTB), flux, low viscous extract, and vacuum gas oils; and (b) a sulphur additive comprising: (i) sulphur; (ii) at least one $H_2S$ suppressant selected from FCC refinery spent catalyst, HDS refinery spent catalyst, DHDS refinery spent catalyst, $Fe(acac)_3$, $Fe(EHA)_3$, $FeCl_3$, calcium oxide, calcium carbonate, bentonite clay, wood charcoal, or combinations thereof; (iii) at least one smell masking agent selected from eugenol, linalool, geraniol, vanillin, iso-amyl ester, phenyl amyl ester, limonene, cinnamaldehyde, or combinations thereof; and (iv) bitumen, wherein the sulphur and the at least one $H_2S$ suppressant is in the weight ratio range of 4:1 to 100:1, and wherein the sulphur additive is in the range of 2-15 wt % with respect to the composition.

In an embodiment of the present disclosure, there is provided a modified bitumen composition as described herein, wherein the composition further comprises at least one filler selected from polyphosphoric acid or phosphorous pentoxide in the range of 0-1 wt % with respect to the composition. In one another embodiment of the present disclosure, the composition further comprises polyphosphoric acid in the range of 0.2-0.7 wt % with respect to the composition. In yet another embodiment of the present disclosure, the composition further comprises polyphosphoric acid in the range of 0.4-0.6 wt % with respect to the composition.

In an embodiment of the present disclosure, there is provided a modified bitumen composition as described herein, wherein the sulphur is in the range of 90-95 wt % with respect to the additive, the at least one $H_2S$ suppressant is in the range of 1.9-7 wt % with respect to the additive, the at least one smell masking agent is in the range of 0.04-0.5 wt % with respect to the additive, and the bitumen is in the range of 0.5-3 wt % with respect to the additive. In another embodiment of the present disclosure, the sulphur is in the range of 93-94.5 wt % with respect to the additive, the at least one $H_2S$ suppressant is in the range of 3.0-6 wt % with respect to the additive, the at least one smell masking agent is in the range of 0.045-0.1 wt % with respect to the additive, and the bitumen is in the range of 0.7-2 wt % with respect to the additive.

In an embodiment of the present disclosure, there is provided a modified bitumen composition comprising: (a) propane deasphalted (PDA) pitch in the range of 70-90 wt % with respect to the composition; (b) vacuum tower bottom (VTB) in the range of 0-17 wt % with respect to the composition; (c) flux in the range of 5-15 wt % with respect to the composition; (d) the sulphur additive comprising the sulphur in the range of 90-95 wt % with respect to the additive, the at least one $H_2S$ suppressant in the range of 1.9-7 wt % with respect to the additive, the at least one smell masking agent in the range of 0.04-0.5 wt % with respect to the additive, and the bitumen in the range of 0.5-3 wt % with respect to the additive; and (e) optionally, at least one filler.

In an embodiment of the present disclosure, there is provided a modified bitumen composition comprising: (a) propane deasphalted (PDA) pitch in the range of 70-80 wt % with respect to the composition; (b) vacuum tower bottom (VTB) in the range of 10-16 wt % with respect to the composition; (c) flux in the range of 6-12 wt % with respect to the composition; (d) the sulphur additive in the range of 2-7 wt % with respect to the composition, comprising the sulphur in the range of 93-94.5 wt % with respect to the additive, the at least one $H_2S$ suppressant in the range of 4.9-5.2 wt % with respect to the additive, the at least one smell masking agent in the range of 0.045-0.1 wt % with respect to the additive, and the bitumen in the range of 0.8-1.5 wt % with respect to the additive.

In an embodiment of the present disclosure, there is provided a modified bitumen composition comprising: (a) propane deasphalted (PDA) pitch in the range of 70.2-75 wt % with respect to the composition; (b) vacuum tower bottom (VTB) in the range of 13-15.5 wt % with respect to the composition; (c) flux in the range of 6.5-10 wt % with respect to the composition; (d) the sulphur additive in the range of 2-7 wt % with respect to the composition, comprising the sulphur in the range of 93-94.5 wt % with respect to the additive, the at least one $H_2S$ suppressant in the range of 4.9-5.2 wt % with respect to the additive, the at least one smell masking agent in the range of 0.045-0.1 wt % with respect to the additive, and the bitumen in the range of 0.8-1.5 wt % with respect to the additive.

In an embodiment of the present disclosure, there is provided a modified bitumen composition comprising: (a) propane deasphalted (PDA) pitch in the range of 82-86 wt % with respect to the composition; (b) flux in the range of 9-11 wt % with respect to the composition; (c) the sulphur additive in the range of 2-7 wt % with respect to the composition, comprising the sulphur in the range of 93-94.5 wt % with respect to the additive, the at least one $H_2S$ suppressant in the range of 4.9-5.2 wt % with respect to the additive, the at least one smell masking agent in the range of 0.045-0.1 wt % with respect to the additive, and the bitumen in the range of 0.8-1.5 wt % with respect to the additive.

In an embodiment of the present disclosure, there is provided a modified bitumen composition comprising: (a) propane deasphalted (PDA) pitch in the range of 82-86 wt % with respect to the composition; (b) flux in the range of 9-11.5 wt % with respect to the composition; (c) the sulphur additive in the range of 2-7 wt % with respect to the composition, comprising the sulphur in the range of 93-94.5 wt % with respect to the additive, the at least one $H_2S$ suppressant in the range of 4.9-5.2 wt % with respect to the additive, the at least one smell masking agent in the range of 0.045-0.1 wt % with respect to the additive, and the bitumen in the range of 0.8-1.5 wt % with respect to the additive; and (d) polyphosphoric acid in the range of 0.4-0.6 wt % with respect to the composition.

In an embodiment of the present disclosure, there is provided a sulphur additive comprising: (a) sulphur; (b) at least one $H_2S$ suppressant; (c) at least one smell masking agent; and (d) bitumen, wherein the sulphur and the at least one $H_2S$ suppressant is in the weight ratio range of 4:1 to 100:1. In one another embodiment of the present disclosure, the sulphur and the at least one $H_2S$ suppressant is in the weight ratio range of 10:1 to 30:1. In yet another embodiment of the present disclosure, the sulphur and the at least one $H_2S$ suppressant is in the weight ratio range of 15:1 to 19:1.

In an embodiment of the present disclosure, there is provided a sulphur additive as described herein, wherein the sulphur is in the range of 90-95 wt % with respect to the additive, the at least one $H_2S$ suppressant is in the range of 1.9-7 wt % with respect to the additive, the at least one smell masking agent is in the range of 0.04-0.5 wt % with respect to the additive, and the bitumen is in the range of 0.5-3 wt % with respect to the additive. In another embodiment of the present disclosure, the sulphur is in the range of 93-94.5 wt % with respect to the additive, the at least one $H_2S$ suppressant is in the range of 3.0-6 wt % with respect to the additive, the at least one smell masking agent is in the range of 0.045-0.1 wt % with respect to the additive, and the bitumen is in the range of 0.7-2 wt % with respect to the additive.

In an embodiment of the present disclosure, there is provided a sulphur additive as described herein, wherein the at least one $H_2S$ suppressant is selected from FCC refinery spent catalyst, HDS refinery spent catalyst, DHDS refinery spent catalyst, $Fe(acac)_3$, $Fe(EHA)_3$, $FeCl_3$, calcium oxide, calcium carbonate, bentonite clay, wood charcoal, or combinations thereof, and the at least one smell masking agent is selected from eugenol, linalool, geraniol, vanillin, isoamyl ester, phenyl amyl ester, limonene, cinnamaldehyde, or combinations thereof. In one another embodiment of the present disclosure, the at least one $H_2S$ suppressant is a combination of $Fe(EHA)_3$ and bentonite clay, and the at least one smell masking agent is vanillin.

In an embodiment of the present disclosure, there is provided a sulphur additive as described herein, wherein the at least one $H_2S$ suppressant is a combination of iron compound selected from $Fe(acac)_3$, $Fe(EHA)_3$, and $FeCl_3$, and calcium compound selected from calcium oxide and/or calcium carbonate.

In an embodiment of the present disclosure, there is provided a sulphur additive as described herein, wherein the at least one $H_2S$ suppressant is a combination of FCC refinery spent catalyst, bentonite clay, and wood charcoal.

In an embodiment of the present disclosure, there is provided a process for preparing the modified bitumen composition as described herein, the process comprising: (a) blending the at least two refinery residues to obtain a homogenous mixture; (b) mixing the sulphur additive to obtain a first mixture; and (c) contacting the homogeneous mixture and the first mixture to obtain the modified bitumen composition.

In an embodiment of the present disclosure, there is provided a process for preparing the modified bitumen composition as described herein, the process comprising: (a) blending the at least two refinery residues to obtain a homogenous mixture carried out at a temperature in the range of 120-180° C. for a period in the range of 20-70 minutes with a stirring speed in the range of 50-400 rpm; (b) mixing the sulphur additive to obtain a first mixture; and (c) contacting the homogeneous mixture and the first mixture to obtain the modified bitumen composition. In one another embodiment of the present disclosure, blending the at least two refinery residues to obtain a homogenous mixture carried out at a temperature in the range of 130-160° C. for a period in the range of 25-65 minutes with a stirring speed in the range of 70-200 rpm. In yet another embodiment of the present disclosure, blending the at least two refinery residues to obtain a homogenous mixture carried out at a temperature in the range of 135-150° C. for a period in the range of 28-35 minutes with a stirring speed in the range of 90-150 rpm. In another embodiment of the present disclosure, blending the at least two refinery residues to obtain a homogenous mixture carried out at a temperature of 140° C. for a period of 30 minutes with a stirring speed of 100 rpm.

In an embodiment of the present disclosure, there is provided a process for preparing the modified bitumen composition as described herein, the process comprising: (a) blending the at least two refinery residues to obtain a homogenous mixture; (b) mixing the sulphur additive to obtain a first mixture; and (c) contacting the homogeneous mixture and the first mixture to obtain the modified bitumen composition carried out at a temperature in the range of 120-180° C. for a period in the range of 20-40 minutes with a stirring speed in the range of 50-400 rpm. In one another embodiment of the present disclosure, the contacting the homogeneous mixture and the first mixture to obtain the modified bitumen composition is carried out at a temperature in the range of 130-160° C. for a period in the range of 25-60 minutes with a stirring speed in the range of 70-200 rpm. In yet another embodiment of the present disclosure, the contacting the homogeneous mixture and the first mixture to obtain the modified bitumen composition is carried out at a temperature in the range of 135-150° C. for a period in the range of 28-35 minutes with a stirring speed in the range of 90-150 rpm. In another embodiment of the present disclosure, the contacting the homogeneous mixture and the first mixture to obtain the modified bitumen composition is carried out at a temperature of 140° C. for a period of 30 minutes with a stirring speed of 100 rpm.

In an embodiment of the present disclosure, there is provided a process for preparing the modified bitumen composition as described herein, the process comprising: (a) blending the at least two refinery residues to obtain a homogenous mixture carried out at a temperature in the range of 120-180° C. for a period in the range of 20-40 minutes with a stirring speed in the range of 50-400 rpm; (b) mixing the sulphur additive to obtain a first mixture; and (c) contacting the homogeneous mixture and the first mixture to obtain the modified bitumen composition carried out at a temperature in the range of 120-180° C. for a period in the range of 20-40 minutes with a stirring speed in the range of 50-400 rpm.

In an embodiment of the present disclosure, there is provided a process for preparing an asphalt pavement, wherein (a) the modified bitumen composition is prepared by the process as described herein; (b) mixing of the modified bitumen composition with asphalt to obtain a compact mixture; and (c) spreading the compact mixture to form a layer of the asphalt pavement.

In an embodiment of the present disclosure, there is provided an asphalt pavement prepared by the process, wherein (a) the modified bitumen composition is prepared by the process as described herein; (b) mixing of the modified bitumen composition with asphalt to obtain a compact mixture; and (c) spreading the compact mixture to form a layer of the asphalt pavement.

In an embodiment of the present disclosure, there is provided use of the modified bitumen composition as described herein, as an additive for road construction and waterproofing.

Although the subject matter has been described in considerable detail with reference to certain examples and implementations thereof, other implementations are possible.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

The working and non-working examples as depicted in the forthcoming sections highlight the criticality of the working percentages of different components including the at least two refinery residues, sulphur and the at least one $H_2S$ suppressant in achieving the modified bitumen composition of the present disclosure. It is further specified that the presence of each of the components disclosed in the embodiments above is critical so as to achieve the required standards for a bitumen composition. The absence of any of the components or replacement of the same with any other substantially affects the properties of the bitumen composition.

Materials and Methods

For the purpose of present disclosure PDA pitch, VTB, and flux were procured from HPCL refinery, Mumbai. Sulfur and bitumen were procured from HPCL refinery Visakh. Polyphosphoric acid, vanillin, and bentonite clay were procured from sigma Aldrich. $Fe(EHA)_3$ was synthesized in the lab as per well-known method in the literature.

Example 1

Process to Prepare Modified Bitumen Composition

Modified bitumen compositions having a combination of two refinery residues and a sulfur additive (three-component) and three refinery residues and a sulfur additive (four-component) were prepared. Firstly, a melt of PDA pitch was prepared by heating PDA pitch in a 250 ml reactor at 140° C. temperature. For four-component blending, VTB and flux were added to the PDA pitch and stirred at 140° C. to get a homogenous mixture. For three-component blending, flux was added to the PDA pitch and stirred at 140° C. to get a homogenous mixture. To each of the homogeneous mixtures obtained above, sulfur additive comprising sulfur, $H_2S$ suppressing agent, smell masking agent, and bitumen was added and the contents were mixed continuously for 30 minutes. The obtained modified bitumen composition was then characterized according to the standard IS 73, 2013 paving bitumen specification. The compositions were tested for the VG30 and VG40 grades, the qualifying parameters for which according to IS 73, 2013 paving grade specification are given below in Table 1. The viscosity and penetration point for the PDA pitch and VTB used in the present disclosure are also mentioned in Table 1.

TABLE 1

| IS 73, 2013 paving grade specification parameters | Viscosity at 60° C. (poises) | Penetration point (0.1 mm) |
|---|---|---|
| VG30 | 2400-3600 | Min. 45 |
| VG40 | 3200-4800 | Min. 35 |
| PDA pitch | 21712 | 7 |
| VTB | 1081 | 95 |

Example 2

Three-Component Modified Bitumen Composition

A three-component modified bitumen composition comprising two refinery residues and a sulfur additive was prepared by adding 84.5 wt % PDA pitch and 10.5 wt % flux (weight percentages calculated with respect to the total weight of the bitumen composition) and blending them at 100 rpm mixing speed at a temperature of 140° C. for 30 minutes to obtain a homogeneous mixture. A sulphur additive was prepared separately by mixing 94 wt % sulfur, 3 wt % $Fe(EHA)_3$, 1.95 wt % bentonite clay, 0.05 wt % vanillin extract, and 1 wt % bitumen to obtain a first mixture (weight percentages calculated with respect to the total weight of the sulfur additive). Lastly, the homogenous mixture and first mixture (first mixture in 5 wt % with respect to the total bitumen composition) were contacted at 100 rpm mixing speed at temperature of 140° C. for 60 minutes to obtain the modified bitumen composition (C1). This composition was examined for penetration point at 25° C. and softening point for the VG30 grade specification, the results for which are illustrated in Table 2. Other mechanical properties such as absolute viscosity, kinematic viscosity, flash point, solubility, and test on residue from rolling thin film oven test were also compared based on the VG 30 specification where the present modified bitumen composition was found qualifying all the test parameters.

TABLE 2

| Characteristics | Experimental results for C1 | VG 30 specification | Result |
|---|---|---|---|
| Penetration point at 25° C., 0.1 mm, min | 45 | 45 | Pass |
| Softening point (° C.), min | 50.2 | 47 | Pass |
| Absolute viscosity at 60° C. (Poises) | 2619 | 2400-3600 | Pass |
| Kinematic viscosity at 135° C. (cSt), min | 496 | 350 | Pass |
| Flash point (° C.), min | 234 | 220 | Pass |
| Solubility in trichloroethylene (%), min | >99% | 99% | Pass |
| Tests on residue from rolling thin film oven test: | | | |
| Viscosity ratio at 60° C., max | 3.34 | 4 | Pass |
| Ductility at 25° C., cm, min | 100+ | 40 | Pass |

Using the process as described above, another three-component modified bitumen composition (C2) was prepared with varied percentages of PDA pitch and flux. It was tested for VG 30 specification the results for which are depicted in the Table 3. A composition, C3 including 0.5 wt % polyphosphoric acid filler along with 85 wt % PDA pitch, 9.5 wt % flux, and 5 wt % sulfur additive was also prepared and tested for VG 40 specification. Correspondingly, another composition C4 with 0.5 wt % polyphosphoric acid filler but varied percentages of PDA pitch (84.2 wt %) and flux (10.3 wt %) was prepared and tested. The results for C3 and C4 are illustrated in Table 4 and Table 5 respectively. It was observed that all the three-component compositions i.e., C2, C3, and C4, also including C1 exhibited acceptable results falling within the standard allowed ranges for both VG30 and VG40 grade specifications.

TABLE 3

VG 30 for three-component modified bitumen composition C2

| Composition code | PDA pitch (wt %) | Flux (wt %) | Sulfur additive (wt %) | Penetration point at 25° C., 0.1 mm | Softening point (° C.) | Absolute viscosity at 60° C. (poises) |
|---|---|---|---|---|---|---|
| C2 | 84.2 | 10.8 | 5 | 45 | 50 | 2485 |

TABLE 4

VG 40 for three-component modified bitumen composition C3 including filler

| Characteristics | Experimental results for C3 | VG 40 specification | Result |
|---|---|---|---|
| Penetration at 25° C., 0.1 mm, min | 37 | 35 | Pass |
| Softening point (° C.), min | 56 | 50 | Pass |
| Absolute viscosity at 60° C. (Poises) | 3287 | 3200-4800 | Pass |
| Kinematic viscosity at 135° C., (cSt), min | 542 | 400 | Pass |
| Flash point, (° C.), min | 239 | 220 | Pass |
| Solubility in trichloroethylene (%), min | >99% | 99% | Pass |
| Tests on residue from rolling thin film oven test: | | | |
| Viscosity ratio at 60° C., max | 2.87 | 4 | Pass |
| Ductility at 25° C., cm, min | 80 | 25 | Pass |

TABLE 5

VG 40 for three-component modified bitumen composition C4 including filler

| Composition code | PDA pitch (wt %) | Flux (wt %) | Sulfur additive (wt %) | Polyphosphoric acid (wt %) | Penetration point at 25° C., 0.1 mm | Softening point (° C.) | Absolute viscosity at 60° C. (poises) |
|---|---|---|---|---|---|---|---|
| C4 | 84.2 | 10.3 | 5 | 0.5 | 39 | 51.4 | 3210 |

Example 3

Four-Component Modified Bitumen Composition

Similar to the process as described in Example 2, a four-component modified bitumen composition (C5) comprising three refinery residues and a sulfur additive was prepared by adding 70.5 wt % PDA, 15 wt % VTB and 9.5 wt % flux (weight percentages were calculated with respect to the total weight of the bitumen composition) and blending at 100 rpm mixing speed at temperature of 140° C. for 60 minutes to obtain a homogeneous mixture. A sulphur additive comprising 94 wt % sulfur, 3 wt % Fe(EHA)$_3$, 1.95 wt % bentonite clay, 0.05 wt % vanillin extract, and 1 wt % bitumen (weight percentages calculated with respect to the total weight of the sulfur additive) was mixed separately to obtain a first mixture. Lastly, the homogenous mixture and first mixture (first mixture in 5 wt % with respect to the total bitumen composition) were contacted at 100 rpm mixing speed at temperature of 140° C. for 60 minutes to obtain the modified bitumen composition. This composition (C5) was tested for the VG30 grade specification, the results for which are illustrated in Table 6.

Using the process as described above, another four-component modified bitumen composition C6 was prepared by varying percentages of PDA pitch and flux and keeping the composition of the sulfur additive same. C5 was tested for VG 30 grade specification while C6 was tested for VG40 grade specification. The results illustrated in Table 6 clearly show that both the four-component compositions C5 and C6 qualified the standard allowed ranges for the VG30 and VG40 grade specification respectively.

TABLE 6

VG 30 (C5) and VG40 (C6) for four-component modified bitumen compositions

| Composition code | PDA pitch (wt %) | Flux (wt %) | VTB (wt %) | Sulfur additive (wt %) | Penetration point at 25° C. | Softening point (° C.) | Absolute viscosity at 60° C. (poises) | Viscosity ratio at 60° C. |
|---|---|---|---|---|---|---|---|---|
| C5 | 70.5 | 9.5 | 15 | 5 | 45 | 51.8 | 2542 | 3.4 |
| C6 | 73 | 7 | 15 | 5 | 36 | 55.7 | 3495 | 3.26 |

Thus, it can be clearly observed from the above studies that both the three-component and four-component compositions exhibit appreciable mechanical properties essential for qualifying the IS 73, 2013 paving specification for VG30 and VG40 bitumen grades. Moreover, the modified bitumen composition prepared by using the process as described herein, shows remarkably reduced $H_2S$ gas emission of less than 10 ppm and as low as 0.1 ppm.

Advantages of the Present Disclosure

The above-mentioned implementation examples as described on this subject matter and its equivalent thereof have many advantages, including those which are described.

The present disclosure relating to a modified bitumen composition comprising at least two refinery residues qualifies the VG30 and VG40 grade specification. Hence it can suitably be used for making road pavements facing heavy traffic loads. In addition to this, the present modifies bitumen composition is highly advantageous in terms of significantly minimized H2S gas emission to as low as 0.1 ppm. The process of preparing the present composition used for making three-component and four-component blends helps in achieving a well-blended modified bitumen composition which exhibits excellent results for all the mechanical properties prescribed under IS 73, 2013 paving grade specification. The raw materials required for the preparation of the composition are readily available and the process of preparation of the composition is also quite simple and rapid. Overall, the present disclosure provides the much-awaited superior quality, high performance environment friendly alternative with promising returns from waterproofing and road constructions applications.

Although the subject matter has been described in considerable detail with reference to certain embodiments thereof, other embodiments are possible. As such, the spirit and scope of the disclosure should not be limited to the description of the embodiments contained herein.

We claim:
1. A modified bitumen composition comprising:
(a) at least two refinery residues;
   wherein the at least two refinery residues are selected from the group consisting of propane de-asphalted (PDA) pitch, vacuum tower bottom (VTB), flux, low viscous extract, and vacuum gas oils; and,
(b) a sulphur additive, wherein the sulphur additive comprises:
   (i) sulphur;
   (ii) at least one $H_2S$ suppressant;
   wherein the at least one $H_2S$ suppressant is selected from the group consisting of FCC refinery spent catalyst, HDS refinery spent catalyst, DHDS refinery spent catalyst, Fe(acac)$_3$, Fe(EHA)$_3$, FeCl$_3$, calcium oxide, calcium carbonate, bentonite clay, wood charcoal, and combinations thereof; and
   (iii) at least one smell masking agent;
   wherein the at least one smell masking agent is selected from the group consisting of eugenol, linalool, geraniol, vanillin, iso-amyl ester, phenyl amyl ester, limonene, cinnamaldehyde, and combinations thereof,

And,
   (iv) bitumen,
   wherein the sulphur and the at least one $H_2S$ suppressant are in a weight ratio range of 4:1 to 100:1.
2. The composition as claimed in claim 1, wherein the sulphur additive is in a range of 2-15 wt % with respect to the composition.
3. The composition as claimed in claim 1, wherein the composition further comprises at least one filler, wherein the filler is polyphosphoric acid or phosphorous pentoxide, and the filler is in a range of 0-1 wt % with respect to the composition.
4. The composition as claimed in claim 1, wherein the sulphur is in a range of 90-95 wt % with respect to the additive, the at least one $H_2S$ suppressant is in the range of 1.9-7 wt % with respect to the sulphur additive, the at least one smell masking agent is in a range of 0.04-0.5 wt % with respect to the sulphur additive, and the bitumen is in a range of 0.5-3 wt % with respect to the sulphur additive.
5. The modified bitumen composition of claim 1 further comprising:
(a) propane de-asphalted (PDA) pitch in a range of 70-90 wt. % with respect to the composition;
(b) vacuum tower bottom (VTB) in a range of 0-17 wt. % with respect to the composition;
(c) flux in a range of 5-15 wt. % with respect to the composition;
(d) a sulphur additive comprising sulphur in a range of 90-95 wt. % with respect to the sulphur additive, at least one $H_2S$ suppressant in a range of 1.9-7 wt. % with respect to the sulphur additive, at least one smell masking agent a range of 0.04-0.5 wt. % with respect to the sulphur additive, and bitumen in a range of 0.5-3 wt. % with respect to the sulphur additive.
6. A sulphur additive comprising:
(a) sulphur;
(b) at least one $H_2S$ suppressant;
   wherein the at least one $H_2S$ suppressant is selected from the group consisting of FCC refinery spent catalyst, HDS refinery spent catalyst, DHDS refinery spent catalyst, Fe(acac)$_3$, Fe(EHA)$_3$, FeCl$_3$, calcium oxide, calcium carbonate, bentonite clay, wood charcoal, and combinations thereof; and,
(b) at least one smell masking agent;
   wherein the at least one smell masking agent is selected from the group consisting of eugenol, linalool, geraniol, vanillin, iso-amyl ester, phenyl amyl ester, limonene, cinnamaldehyde, and combinations thereof,
and
(c) bitumen,
wherein the sulphur and the at least one $H_2S$ suppressant are in a weight ratio range of 4:1 to 100:1.
7. The additive as claimed in claim 6, wherein the sulphur is a range of 90-95 wt % with respect to the sulphur additive, the at least one $H_2S$ suppressant is in a range of 1.9-7 wt % with respect to the sulphur additive, the at least one smell masking agent is in a range of 0.04-0.5 wt % with respect to the sulphur additive, and the bitumen is in a range of 0.5-3 wt % with respect to the sulphur additive.
8. The modified bitumen composition as claimed in claim 5, further comprising at least one filler.

\* \* \* \* \*